United States Patent [19]

Mäkipirtti

[11] 4,054,446
[45] Oct. 18, 1977

[54] PROCESS FOR THE REFINING OF A METAL SULFIDE MELT

[75] Inventor: Simo Antero Iivari Mäkipirtti, Nakkila, Finland

[73] Assignee: Outokumpu Oy, Outokumpu, Finland

[21] Appl. No.: 700,724

[22] Filed: June 28, 1976

[30] Foreign Application Priority Data

Aug. 12, 1975 Finland .................... 752283

[51] Int. Cl.$^2$ .................... C22B 15/00
[52] U.S. Cl. .................... 75/76; 75/89; 75/93 E
[58] Field of Search ......... 75/21, 23, 26, 63, 89–90 R, 75/72, 74, 76, 93 E; 112/113

[56] References Cited

U.S. PATENT DOCUMENTS

| | | | |
|---|---|---|---|
| 2,147,672 | 2/1939 | Rodrian | 75/21 |
| 3,459,535 | 8/1969 | Vizsolyi et al. | 75/21 |
| 3,552,948 | 1/1971 | Guerrieri | 75/90 |
| 3,754,891 | 8/1973 | Bryrk et al. | 75/23 |
| 3,802,870 | 4/1974 | Bell | 75/63 |

Primary Examiner—Walter R. Satterfield
Attorney, Agent, or Firm—Brooks, Haidt, Haffner & Delahunty

[57] ABSTRACT

A process for removing the impurities, such as arsenic, antimony, bismuth, and/or lead, from a metal sulfide melt, such as copper sulfide melt, in which there is a melt solubility gap between the metal to be refined and its sulfide, in which the metal sulfide melt is first sulfidized in order to shift the composition of the melt away from the range of the solubility gap and the sulfidized metal sulfide melt is thereafter exposed to a selective chlorination to remove the impurities as vaporizable chlorides from the metal sulfide melt by a technique known per se, while the sulfur concentration in the melt is simultaneously controlled in such a manner that the composition of the melt remains outside the said melt solubility gap.

5 Claims, 2 Drawing Figures

PROCESS FOR THE REFINING OF A METAL SULFIDE MELT

BACKGROUND OF THE INVENTION

The process according to the present invention relates to the removal of the impurities from the often highly impure copper sulfide melts obtained in the pyrometallurgical processing of sulfidic complex and mixed ores of copper. The great harmfulness of the impurity metals Pb, Zn, Ni, As, Sb, Bi, etc. in the pyrometallurgical refining processes of copper is generally known. These impurities are not slagged or vaporized to a sufficient degree when the ores are processed into crude metal. When crude copper is refined electrolytically these impurities greatly disturb the processing. Even very small As, Sb, Bi, and Pb amounts present in refined metal or metal alloy easily rise its heat treatment temperature very high or render the treatment impossible. These metals also have very disadvantageous effects on the other physical properties of copper and its alloys.

Certain impurities, e.g., Pb, (Ni), As, Sb, and Bi, thus cause great problems in the metallurgy of copper. In pyrometallurgical processes the compounds of these components, being easily dissociated into metals, accompany the principal metal throughout the process. Attempts are made at each stage of the process to remove these components, since if they remain in the crude metal they complicate its refining and even in very low concentrations in the final product spoil it (in conductive copper the concentrations of As, Sb, and Bi per component should be less than 0.001% by weight).

When copper is manufactured by conventional processes (reverberatory smelting, converting, electrolysis), part of the arsenic, antimony, bismuth, lead, etc. can be removed but not to a sufficient degree. Attempts have been made continuously to develop the techniques of removing the impurities at different stages of the process.

In the production of sulfide matte the removal of the impurity components under discussion can be affected by the selection of a suitable smelting technique. Approx. 50% of the said impurities remain in the sulfide phase in shaft, reverberatory, and electric-furnace smelting. Considerably better results are obtained in suspension processes, especially in regard to arsenic and bismuth and especially when producing mattes rich in valuable metals. Some examples of the conventional suspension processes are those according to U.S. Pat. Nos. 3,754,891, 3,790,366, 2,506,557, 3,555,164, and 3,686,656 and the processes analogous to them. In these processes the volatile heavy-metal compounds easily pass into the gas and flying-dust phases owing to the high temperature of the suspension roasting. In vertical processes the passing of the impurities (e.g., Zn, Pb, Sb) into the gas phase can be aided by means of a reduction of the suspension after the suspension roasting, e.g., according to the process described in my copending, commonly assigned U.S. application Ser. No. 682,157 filed Apr. 30, 1976. If the impurities to be vaporized are combined together with copper in stable complex structures, the dissociation of these structures and the rearrangement of the mineral lattices into simple structures promotes the vaporization of the impurities. One method for the rearrangement prior to the smelting of the concentrate is described in commonly assigned, copending U.S. application Ser. No. 587,662, filed June 17, 1975.

By means of the development in recent years it has been possible to increase the separation of the impurities under discussion per apparatus at the conversion stage from the conventional values (70–75%) to values above 90%. The separation has been improved by, for example, combining the impurities by oxidizing them with alkali or iron oxides into stable compounds separable from the melt. One of the processes is that according to U.S. Pat. 3,744,922, in which antimony is combined with iron in a mixed spinel lattice. When copper and copper-nickel (<28% Ni) mattes are converted, the metal melt with a low sulfur content separates from the sulfide matte as a phase of its own owing to the melt solubility gap between the sulfide and the metal phases. This produced metal "preliminary drop" contains, owing to the activity conditions in the M3—MeS systems, a great number of various concentrated components (Ag, Au, Pd, Sn, As, Sb, Bi, etc.). The said components can be substantially decreased in the principal melt by separating this "preliminary drop" at the initial stage of the sulfide oxidation. Some examples of these processes are those described in U.S. Pat. No. 2,425,760 and DT-PS No. 1,922,599.

In recent years, attempts have also been made to remove the impurities from a sulfide melt by developed vacuum or gas vacuum processes (e.g., H. Kametani et al., Trans. JIM, 14, 1973, 218–223).

Processes according to the new process under discussion, based on a chlorinating vaporization of the impurities from a copper sulfide melt, are most likely not known. This is because copper readily becomes chlorinated along with the impurities. The chlorination of solid sulfide concentrates (Cu, Zn, Pb, Ag, Ni, Co, Sn, etc.) in order to recover valuable metals is, however, well known as a process of low temperatures (e.g., J. Garlach et al.: Trans. AIME, 239, 1967, 1557; Erzmetall, 21, 1968, 9). The chlorination of the sulfide matte of nickel by means of both gaseous chlorine and the chloride of nickel by using salt melts is known. Thereby the impurities (e.g., Cu, Pb, Sn, Co, Fe, As, Sb) are removed from molten nickel matte. Some examples of descriptions of the process are those in U.S. Pat. Nos. 3,660,026, 3,802,870, and M. C. Bell et al.: Purification of Nickel Matte (103rd AIME Annual Meeting, Dallas Tex., Feb. 24–28, 1974, 1–18).

It should be noted that the technique used for the prepurification of the crude metal in an anode furnace is the same as in conversion. Some of the different processes are the selective oxidation of the impurities with earth-alkali oxides, the binary-salt processes (DT-PS No. 1,137,223), the oxidation of melt with copper oxide (As, Sb, and Bi: Jap. 19032-3 (1969)), and the vacuum methods (e.g., J. Bocle et al.: Erzmetall, 24, 1971, 480). Halogen salt vaporization is also used for the purification of cement copper in molten state ($AlNs_3F_6$: U.S. Pat. No. 3,630,722).

SUMMARY OF THE INVENTION

The object of the present invention is thus to provide a process for removing the impurity metals either partially or entirely from the copper sulfide melt obtained from the converter oxidation of the iron present in sulfide matte. The impurity components are removed as vaporizable chlorides by a method known per se by a selective chlorination of the sulfide melt. When a conventional converter sulfide is chlorinated a sufficient degree of selectivity is not obtained since the activity of copper in the sulfide melt is so high that it is chlorinated along with the impurities. The disadvantageous properties of copper sulfide melt are due to the melt solubility gap between copper and its sulfide; the technical matte is within this solubility gap. Therefore, in the process according to the invention the first step is to shift the composition of the melt from the solubility gap by increasing its sulfur content to approach the saturation values of the melt. Thereby the oxygen content in the melt and the activities of both copper and its sulfide are lowered to such an extent that a selective chlorination of the impurities from the melt is possible. The chlorination is performed thereafter by conventional techniques either with pure chlorine gas or with a mixture of chlorine and some inert gas. If the impurity concentrations in the melt are high, the melt must be sulfidized occasionally during the chlorinating treatment or a gas mixture containing elemental sulfur must be used in the chlorination.

After the chlorination, crude metal is produced from the sulfide melt by conventional processes by continuing its oxidation in a converter.

The invention thus relates to a process for the removal of metallurgically harmful impurities from a copper matte melt after the iron blasting in the conversion. According to the process the secondary components present in the melt, Zn, Pb, As, Sb, Bi, Fe, Co, Ni, (Ag, Au), etc., can be removed either entirely or partially by a chlorinating treatment within the temperature range 1150°–1250° C. The process is based on the idea that the chlorination of copper, which is the basic metal, is substantially prevented by changing the composition of the melt so that the processing can be performed outside the Cu—Cu$_x$S melt solubility gap within the sulfur-rich ranges of the melt.

The object of the invention is thus to provide a process by means of which the metallurgical problems due to the use of complex and mixed concentrates are advantageously eliminated.

DESCRIPTION OF THE PREFERRED EMBODIMENTS

In a process according to the invention the impurities are removed entirely or partially by chlorination from the sulfide melt after the conversion of the iron of copper matte. The technical sulfide melt after oxidation is within the range of the solubility gap in the Cu—S system and thus the activity of copper is so high in the melt that it is chlorinated along with the impurities or before them. Since the impurities concentrating in a sulfur-poor metal phase usually have very low activities, and furthermore, their chlorides are less stable than copper chloride at the operation temperatures of the process, their removal from the melt is very meager.

In the process, in order to eliminate the said disadvantages, the oxygen is first removed from the sulfide melt and simultaneously the composition of the melt is brought sufficiently outside the solubility gap, to the sulfur-rich range of the melt. Thereafter the impurities are chlorinated with pure chlorine gas or with a mixture of chlorine and elemental sulfur gases, simultaneously or periodically, depending on the quantity of the impurities.

Theoretical basis of the process Me—Cl$_2$ systems

The dissociation pressures of metal chlorides are indicated in the table below in the order of stability of the chlorides within the operation range of the process, i.e., 1150°–1250° C.

| log P$_{Cl_2}$ = A/T + B log T − C Me$_x$Cl$_y$ | A | B | C |
|---|---|---|---|
| AgCl | 13788 | 17.660 | 4.196 |
| ZnCl$_2$ | 20512 | −2.064 | −8.441 |
| FeCl$_2$ | 5522 | 5.030 | 19.604 |
| PbCl$_2$ | 8266 | 3.564 | 12.666 |
| CuCl | 12705 | — | −2.747 |
| CoCl$_2$ | 4745 | 3.018 | 12.093 |
| SbCl$_3$ | 11741 | — | −2.331 |
| NiCl$_2$ | 4339 | 1.743 | 7.853 |
| AsCl$_3$ | 11446 | — | −2.694 |
| BiCl$_3$ | 10164 | — | −2.204 |

According to the table, Co, Sb, As, and Bi are thus not removable as chlorides from the metal melt without great copper chloride losses. The activities of these components in the copper melt are, furthermore, lower than the ideal, so that under actual conditions the chlorination of the components is not successful. For example (J. Bode: Erzmetall, 24, 1971, 480), in a copper melt which contains As and Sb ~2% by weight, the activity coefficients of these components (a/N) are only $\gamma_{As} = 1.1 \times 10^{-6}$ and $\gamma_{Sb} = 3.5 \times 10^{-3}$. Calculated from the table, the dissociation pressures of the chlorides of Pb and Cu at 1500° K are respectively $1.4 \times 10^{-7}$ and $1.9 \times 10^{-6}$ atm, so that judging from the difference of almost a decade between the dissociation pressures, lead should chlorinate easily from the copper melt. Under actual conditions, however, lead cannot be removed from copper melt by chlorination to sufficiently low concentrations.

Me—Cl$_2$—S$_2$ Systems

Figure 1:
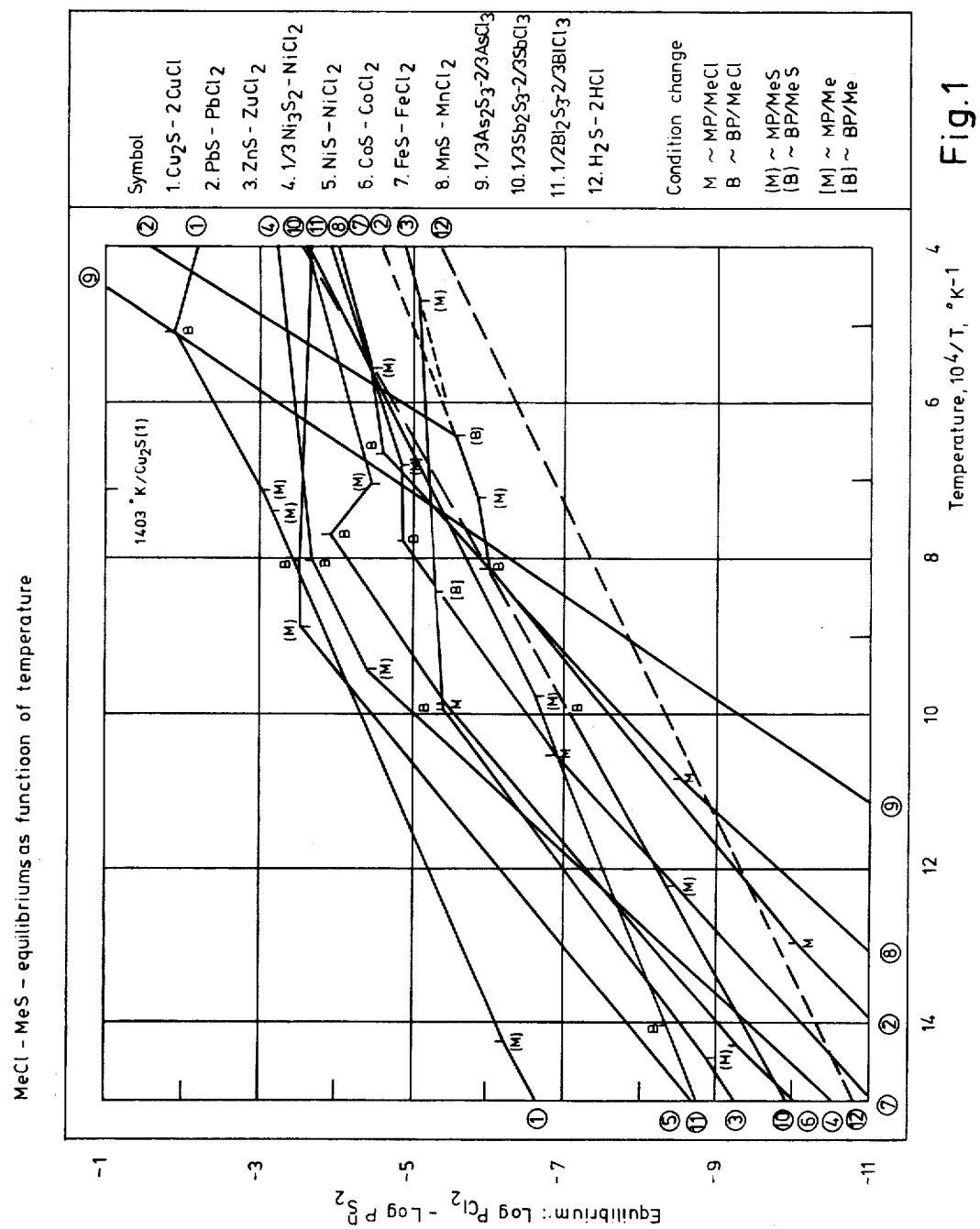
FIG. 1 depicts the equilibrium of the system MeCl-MeS as a function of the temperature.

In the Me—Cl$_2$—S$_2$ system the equilibriums prevailing in regard to different impurity metals have been calculated as functions of the temperature from known thermodynamic functions and are given in FIG. 1. According to the figure the equilibrium conditions of Reaction (1)

$$Cu_2S(l) + Cl_2(g) \rightleftarrows 2CuCl(l) + \tfrac{1}{2} S_2(g) \tag{1}$$

are such that within a limited pressure ratio and temperature range the impurity metals are in the form of gaseous chlorides within the stability range of the Cu$_2$S melt (e.g., log P$_{Cl_2}$ − log P$_{S_2}{}^n$ = − 3, T > 1403° K). In the calculations in the figure the compounds are in their basic state (Reaction (1): log P$_{Cl_2}$ − $\tfrac{1}{2}$ log P$_{S_2}$ = $\Delta G_T°$/RTln10 + log ((a$_{CuCl}$ = 1)$^2$/(a$_{Cu_2S}$ = 1)). In order to realize the chlorination of the impurity metals, their activities must be sufficient.

When a conventional impure copper sulfide melt obtained after iron blasting was chlorinated in a converter, it could be noted that the As, Sb, and Bi were not chlorinated at all and that Pb, Co, and Ni were chlorinated very poorly. In addition to zinc, the principal metal, i.e., copper, was chlorinated to a considerable degree from the sulfide melt.

Activity conditions of the system Cu—S—Me

The Cu—S is known to be characterized by a very sharp solubility gap between $Cu_xS$ melt and the sulfur-poor, metallic Cu melt. This solubility gap does not disappear under the effect of the impurity components under discussion (small quantities of Fe, Co, Ni, Pb, Zn, As, Sb, Bi, Ag).

It has been discovered by research that when a Cu—Fe—S matte is produced and converted technically, the system is always at the boundary of the solubility gap, regardless of the stage of oxidation. It has been discovered by detailed research that a strong sulfur activity change occurs in the binary Cu—S when a shift takes place from a metal-saturated to a sulfur-saturated metal within the composition range of $Cu_2S$ melt. It can be assumed that the melt has dissociated in regard to copper as follows:

$$2Cu^{+1}(Cu_2S:1) = (Cu^* + Cu^{+2})(Cu_2S:1) \quad (13)$$

The following value is obtained for the equilibrium constant from the measured values (J. Lumsden, Thermodynamics of Molten Salt Mixtures, Academic Press, 1966, 312-314):

$$RT\ln K = -35130 + 6.00\,T \quad (14)$$

According to measurements (F. Johannsen et al.: Erzmetall, 13, 1961, 37) at 1200° C the metal saturation boundary of the Cu—S system is sulfur concentration 19.52% by weight. At the same temperature the sulfur pressure function within the stable composition range of the melt, i.e., 19.52–21.00% by weight S in equilibrium with it (M. Nagamori, T. Rosenqvist: Met. Trans., 1, 1970, 329–330) is of the form:

$$\log P_{S_2} = -92.412 + 2.679\,N_S(at-\%) \quad (15)$$

According to the equation the ratio of the equilibrium sulfur pressures corresponding to change in the sulfur concentration in the melt between the saturation values, i.e., $\Delta S = 1.48\%$ by weight, is $2.5 \times 10^5$, i.e., more than five decades. There is respectively a considerable decrease in the activity values of both copper and its sulfide when the sulfur pressure increases. According to the observations it can thus be expected that the Cu—S melt contains free copper even much before the solubility gap boundary, and thus even a great amount at the solubility gap. Nernst's distribution in the $Cu_xS$—Cu system favors a strong concentration of impurities in the metal phase. In the experiments performed (1200° C) the following values ($\chi$/Me) were obtained for Nernst's distribution ($\chi$ = (% by weight Me in Cu)/(% by weight Me in $Cu_xS$): 9–13/As, 17–18/Sb, 6–8/Bi, 4–5/Ni, 3–5/Pb, 1–2/Co, 1–2/Zn, 0.1–0.5Fe.

It can be assumed that the reason for the failure of the chlorination experiments with technical sulfide matte mentioned above was the strong concentration of the impurities, specifically in the metal phase of the matte where the activities of these components are very low.

It should be noted that precise measurements of the activities of different Cu—S systems are almost completely absent in literature. We shall mention, however, one example of measurements performed in the Cu—Pb—S system (K. Azuma et al., J. Min. Met. Inst., Japan 86, 1970, 35–40); the example is imprecise but serves as a guideline. The boundary compositions of the solubility gap (1200° C) of the system (% by weight: Cu/Pb/S) were as follows: sulfide— 75.00/10.92/18.08 and metal — 57.70/40.75/1.55. The activity coefficient obtained for the lead sulfide in the system was $\gamma_{PbS} = 0.096$. Above the solubility gap in the case of a pseudobinary the above lead concentration in the sulfide phase is corresponded by 69.78/10.92/19.30. The activity coefficient of molten lead sulfide is in that case $\gamma_{PbS} = 2.26$ (approximately calculated from Azuma's measurements: $\gamma_{PbS} = 0.60[1 - N_{Cu_2S}]^{-1}$). In the case of a pseudobinary the PbS activity coefficient of a sulfide corresponding to the same lead concentration is approx. 24 times greater than at the solubility gap.

Chlorination experiments outside the solubility gap

One of the experiment series performed in order to study the selective chlorination of the impurities of the Cu—S system is discussed.

A sulfide mixture was prepared by adding more impurity compnents and at the same time adding small metallic copper to a Cu—S converter matte after converter blasting. The composition of the obtained sulfide melt (% by weight Me) was as follows: 76.46 Cu, 0.24 Fe, 2.37 Ni, 0.11 Co, 0.06 Zn, 1.19 Pb, 0.32 As, 0.34 Sb, 0.33 Bi, 0.58 O, and 17.31 S. The experiments were performed with an approx. one-kilogram batch in a (melt-sintered) $Al_2O_3$ crucible situated in an induction furnace provided with a graphite muffle. NaCl melt was used on top of the sulfide melt as protection against oxidation.

Direct experiments of melt chlorination were first performed at 1200° C. The chlorinating agent was a gas mixture containing chlorine and nitrogen gases 30% and 70% by vol. The salt quantity was approx. 6% of the weight of the batch. The duration of the treatment was half an hour.

The analysis of one chlorinated sulfide melt (% by weight Me) was: 75.58 Cu, 0.13 Fe, 2.42 Ni, 0.09 Co, 0.02 Zn, 1.04 Pb, 0.32 As, 0.31 Sb, 0.32 Bi, and 19.0 S. The analysis of the salt melt was respectively: 32.4 Cu, 0.8 Fe, 1.3 Ni, 0.2 Co, 0.1 Zn, 0.7 Pb, <0.1 As, Sb, Bi, and 1.0 S. As calculated from the material balance, approx. 11% of the copper was chlorinated, but only 47% of the chlorinated copper remained in the salt melt. The following values are obtained from the material balance for the vaporization of the impurity metals: 52 Fe, 8 Ni, 27 Co, 75 Zn, 21 Pb, 8 As, 19 Sb, and 12 Bi. If all the impurity metals are calculated as chlorides, 94% is obtained as the efficiency of the use of chlorine.

In order to shift the composition of the sulfide melt away from the solubility gap range and to approach its saturation values in regard to sulfur, experiments were performed with different sulfidizing agents, such as hydrogen sulfide, covelline (CuS), pyrite, and other dissociating sulfur-bearing substances. Elemental sulfur vapor proved to be the best sulfidizing agent.

In order to shed light on the chlorination mechanism of the melt, it was saturated with sulfur before the chlorinating treatment. The arrangements for the experiment were in other respects as in the initial ones. Samples were taken from the melt as a function of the time in order to observe changes in its composition. The analyses of the samples and the material balance of the system are given in appended Table 1.

Figure 2:
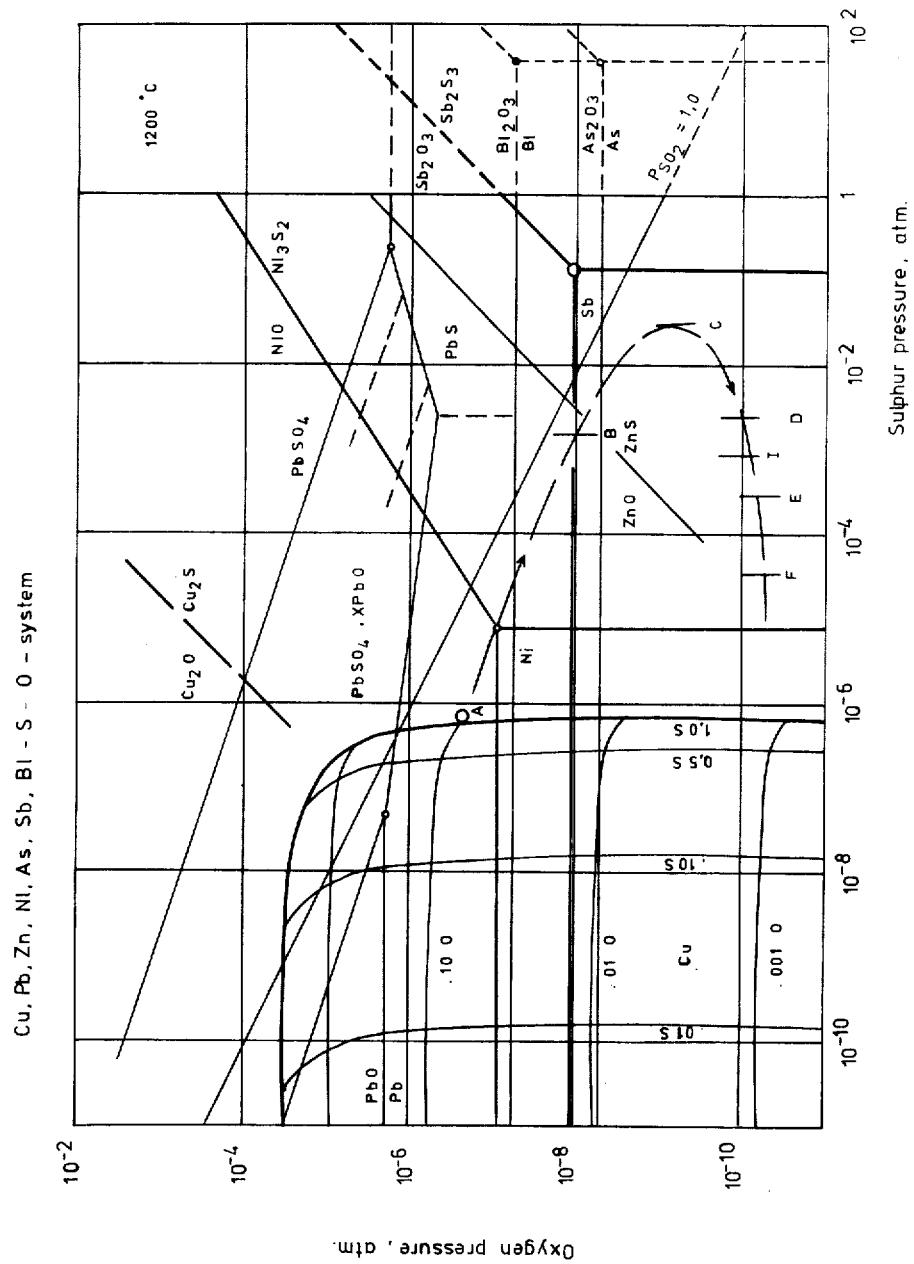
FIG. 2 depicts the potential diagram of the system Me—S—O at 1200° C as a function of the sulfur and the oxygen pressures.

In order to make observations concerning the experiment, the potential diagrams of Me—S—O systems at 1200° C as functions of the sulfur and the oxygen pressures have been drawn in FIG. 2 on the basis of known thermodynamic functions.

At the final stage of the iron blasting of the sulfide matte the SO₂ pressure of the gas phase is somewhat below the 0.2 isobar at the edge of the Cu—S solubility gap. The small impurity component additions mentioned above do not change the situation. Both in FIG. 2 and in Table 1 the position and composition of the initial sulfide are indicated by A. It should be mentioned that in a microsonde analysis of a sample taken from the initial sulfide, the following values were obtained as an approximate analysis of the metal phase (% by weight Me): 77.2 Cu, 9.6 Ni, 0.2 Co, 4.8 Pb, 2.3 As, 3.1 Sb, 1.7 Bi, and ~1 S.

In a position corresponding to the composition A the impurity components, with the exception of the lead melt with a low sulfur content, are in their basic state in the potential field of the oxide phases.

Prior to chlorination, in order to shift the composition of the melt away from the solubility gap and to lower its oxygen content, the sulfur content in the melt was increased by blasting the elemental sulfur vapor into it. The oxygen concentration in the melt was not determined, but on the basis of a solid sample it was very low (<0.1% O). Judging from the Cu$_x$S structure of the sample the position of the sulfidized basic melt in FIG. 2 has shifted to position B in regard to the sulfur pressure.

When the melt B was chlorinated the concentrations of iron, zinc, lead, and bismuth decreased sharply (Table 1, point C) already in the course of the first minutes. The vaporizations of the other components were low. Especially noteworthy is the increase in the sulfur content in the sample, although sulfur was not fed along with the chlorinating gases (according to the material balance the total sulfur in the melt, however, did lower approx. 0.2% of the initial quantity). According to the potential diagram the position of the composition C corresponds to the stability ranges of sulfides in regard to lead and zinc. As, Sb, and Bi may all be in the melt partly in the form of a metal solution since the sulfides (perhaps with the exception of Sb) are not stable in the entire potential field.

When the treatment was continued, the As and Sb were also strongly chlorindated. The Ni and Co of the melt were also chlorinated, although more slowly than the former ones. In accordance with Table 1, the sulfur contents in the melts lowered as a function of the time (D, E, F). According to an examination of the samples their position in the potential diagram (FIG. 2) again shifted towards low sulfur contents and thereby towards the solubility gap of the Cu—S system. During the chlorinating treatment there occurred in regard to the Cu—S system the loop-shaped change in the sulfur and acid potentials, indicated by the arrow in FIG. 2.

It should be noted that when the system approaches the solubility gap, the Cu and Cu₂—S activities begin to increase, and so copper is also easily chlorinated from the melt. According to the process the NaCl salt melt serves as a protective melt. When the operation takes place with the high S₂ potentials required by the process, the direction of the reaction is

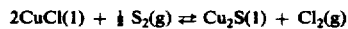

2CuCl(l) + ½ S₂(g) ⇌ Cu₂S(l) + Cl₂(g)

and the equilibrium constant of the reaction at 1200° C is Kp = 724. Since the CuCl—NaCl solution can be regarded as a regular solution according to measurements and analogies, it can be shown by calculations that the activity of CuCl in the salt melt is so high that the cuprous chloride which has passed into the solution during the processing is resulfidized under the effect of the high sulfur potential in the system. The results obtained in connection with the chlorination also corroborate these assumptions. Although pure chlorine gas can be used in the process, very low copper concentrations in the chloride melt are obtained with a lowered chlorine pressure (addition of N₂ gas or a neutral gas) without S₂ feed. In the initial experiments it was observed that when the S₂ potential is low in the sulfide melt, CuCl dissolves in the chloride melt in correspondence with gapless solubility. When a high sulfur potential is used in the sulfide melt, a CuCl—NaCl salt mixture can also be used for the chlorination of the melt, if sufficient mixing is achieved.

Although the sulfur added to the sulfide melt seems to remain very well in the melt during the chlorinating treatment, it is necessary, if the impurity quantities are high, to re-perform the sulfidization during the treatment or to use, for example, at the final stage of the treatment a sulfur-bearing chlorinating agent required by the Me—Cl₂S₂ equilibrium systems discussed above.

A conventional Peirce-Smith converter, dimensioned 2.6 × 6.7 m, was employed in the technical realization of the new process. Sulfidizing and chlorination were not, however, performed through tuyeres in the experiments but by means of four flanges immersed in the melt.

The sulfide melt to be treated was a conventional concerter matte after the oxidation of iron, with impurities added to it. The composition of the melt (% by weight) was as follows: 75.90 Cu, 0.30 Ni, 0.20 Co, 0.50 Fe, 0.69 Zn, 1.00 Pb, 0.50 As, 0.60 Sb, 0.90 Bi, 0.32 O, 18.99 S, and 0.10 SiO₂.

Example

One large-scale example of the process according to the invention is discussed here. The material and thermal balances and analyses corresponding to the example have been compiled in Table 2.

Approx. 50 tons of converter matte melt from iron blsting (Mk—1) was sulfidized with sulfur vapor and the thereby obtained sulfide matte (Mk—2) was chlorinated with a gas mixture containing technical nitrogen approx. 50% by vol.

The behavior of the melt in the chlorination process was completely analogous to those mentioned above. The matte from the sulfidizing contained somewhat more sulfur than the chlorinated metal-bearing matte discussed above. The sulfide melt from the chlorination (Mk—3) settles at position I in the potential diagram of FIG. 2, which corresponds to a sulfur content of 20.2% in the Cu—S system.

In the condensed chloride melt the copper concentration was 12.2 %. This concentration corresponds to a copper yield of approx. 98% after chlorination, so that the result obtained is very good considering the primitive arrangements for the experiment. The value obtained for the efficiency of the use of chlorine was 95%. The temperature of the sulfide melt lowered in the process from the original value 1220° C to approx. 1180° C.

The examples discussed in this process description are by no means the only embodiments of the new process. What is essential in the new process is that in order to ensure the economic and technical success of the process the chlorination must be performed outside the solubility gap of the system Cu—Me—S and specifically close to the sulfur saturation values of the sulfide melt.

simultaneously maintaining the composition of the melt outside the melt solubility gap by controlling Table 1.

Sulfide melt chlorination experiment

| Balance component | | Duration of experiment | $S_2$ pressure -log $P_{S_2}$ | Quantity of material | Analysis, % by weight | | | | |
|---|---|---|---|---|---|---|---|---|---|
| | | | | | Cu | Fe | Ni | Co | Zn |
| Initial product | A | 0 | 6.2 | 100.00 | 76.46 | 0.24 | 2.37 | 0.11 | 0.06 |
| Sulfidized product | B | 0 | 2.8 | 102.82 | 74.36 | 0.23 | 2.30 | 0.10 | 0.06 |
| Sample | C | 1/6 h | 1.5 | 102.21 | 74.81 | 0.02 | 2.32 | 0.10 | 0.01 |
| Sample | D | 1/3 h | 2.6 | 100.46 | 76.11 | 0.00 | 2.19 | 0.09 | 0.00 |
| Sample | E | 1/2 h | 3.6 | 99.60 | 76.77 | 0.00 | 2.02 | 0.06 | 0.00 |
| Final product | F | 1 h | 4.4 | 98.18 | 77.11 | 0.02 | 1.95 | 0.02 | 0.00 |

| Balance component | | Duration of experiment | Quantity of material | Analysis, % by weight | | | | | |
|---|---|---|---|---|---|---|---|---|---|
| | | | | Pb | As | Sb | Bi | S | O |
| Initial product | A | 0 | 100.00 | 1.19 | 0.32 | 0.34 | 0.33 | 17.31 | 0.58 |
| Sulfidized product | B | 0 | 102.82 | 1.16 | 0.31 | 0.33 | 0.32 | 20.05 | — |
| Sample | C | 1/6 h | 102.21 | 0.57 | 0.27 | 0.33 | 0.11 | 20.13 | — |
| Sample | D | 1/3 h | 100.46 | 0.05 | 0.26 | 0.27 | 0.02 | 20.21 | — |
| Sample | E | 1/2 h | 99.60 | 0.00 | 0.22 | 0.16 | 0.00 | 19.97 | — |
| Final product | F | 1 h | 98.18 | 0.00 | 0.02 | 0.00 | 0.00 | 19.50 | — |

Table 2.

Chlorinating refining of converter copper matte in converter

| Material and thermal balances | | Quantity of material, tons | Heat amount, Mcal |
|---|---|---|---|
| Feed 1 | Converter matte - Mk-1 | 50.00 | 37550 |
| | Sulfur | 0.93 | 2050 |
| Product 1 | Saturated matte - Mk-2 | 50.77 | 39600 |
| Feed 2 | Chlorine | 2.27 | — |
| | Nitrogen | 0.90 | — |
| Product 2 | Chlorinated matte - Mk-3 | 48.83 | 34550 |
| | Chlorides | 5.23 | 1230 |
| | Sulfur | 0.98 | 2730 |
| | Nitrogen | 0.90 | 280 |
| | Thermal loss | | 600 |
| Product 2 | Total | 53.04 | 39390 |

| Balance component | Analysis, % by weight | | | | | | | | | |
|---|---|---|---|---|---|---|---|---|---|---|
| | Cu | Fe | Ni | Co | Zn | Pb | As | Sb | Bi | S |
| Mk-1 | 75.90 | 0.50 | 0.30 | 0.20 | 0.69 | 1.00 | 0.50 | 0.60 | 0.90 | 18.99 |
| Mk-2 | 74.76 | 0.49 | 0.30 | 0.20 | 0.68 | 0.99 | 0.49 | 0.59 | 0.89 | 20.53 |
| Mk-3 | 79.43 | 0.03 | 0.19 | 0.03 | 0.01 | 0.01 | 0.02 | 0.01 | 0.00 | 20.16 |
| $MeCl_x + S_y$ | 12.23 | 3.83 | 0.97 | 1.37 | 5.48 | 7.97 | 3.87 | 4.76 | 7.24 | 15.77 |

What is claimed is:

1. A process for refining a copper sulfide melt exposing a melt solubility gap between the metal to be refined and its sulfide, comprising:
   first bringing the composition of the melt away from the range of the solubility gap by sulfidizing the copper sulfide melt to a sulfur concentration of about 19.5% to about 21.5% by weight;
   then removing impurities as vaporizable chlorides from the copper sulfide melt by chlorinating the sulfidized copper sulfide melt with elemental chloride containing gas at a temperature of 1150°-1250° C; and sulfur addition to the melt.

2. A process according to claim 1, including saturating the copper sulfide melt with sulfur before said chlorination.

3. A process according to claim 1, wherein the copper sulfide melt is sulfidized with elemental sulfur vapor, hydrogen sulfide, covelline, or pyrite.

4. A process according to claim 1 in which said elemental chlorine containing gas is a gas mixture of chlorine gas and nitrogen gas.

5. A process according to claim 4, wherein said gas mixture contains from 30-50% chlorine by volume and from 70-50% nitrogen by volume.

* * * * *